(12) United States Patent
Maitre et al.

(10) Patent No.: US 12,080,138 B2
(45) Date of Patent: Sep. 3, 2024

(54) AUDIO DEVICE AND METHOD OF USE

(71) Applicant: Research Institute at Nationwide Children's Hospital, Columbus, OH (US)

(72) Inventors: Nathalie Maitre, Columbus, OH (US); Will Ray, Columbus, OH (US); Olena Chorna, Columbus, OH (US); Ellyn Evans, Athens, GA (US)

(73) Assignee: The Research Institute at Nationwide Children's Hospital, Columbus, OH (US)

( * ) Notice: Subject to any disclaimer, the term of this patent is extended or adjusted under 35 U.S.C. 154(b) by 0 days.

(21) Appl. No.: 17/689,374

(22) Filed: Mar. 8, 2022

(65) Prior Publication Data

US 2022/0198901 A1 Jun. 23, 2022

Related U.S. Application Data

(62) Division of application No. 16/334,459, filed as application No. PCT/US2017/051971 on Sep. 18, 2017, now Pat. No. 11,302,167.

(Continued)

(51) Int. Cl.
*G08B 21/02* (2006.01)
*G08B 3/10* (2006.01)
*H04B 1/3827* (2015.01)

(52) U.S. Cl.
CPC ........... *G08B 21/0208* (2013.01); *G08B 3/10* (2013.01); *H04B 1/3827* (2013.01)

(58) Field of Classification Search
CPC .................................................. G08B 21/0208
See application file for complete search history.

(56) References Cited

U.S. PATENT DOCUMENTS 4,221,927 A * 9/1980 Dankman ................ A63H 5/00
446/175
4,819,616 A 4/1989 Samson
(Continued)

FOREIGN PATENT DOCUMENTS

BR 11 2019 005277-1 9/2017
CN 204087544 1/2015
(Continued)

OTHER PUBLICATIONS

Technical Examination Report, Written Opinion in Brazilian Patent Application No. BR 11 2019 005277-1, issued Feb. 22, 2022, under the Brazilian PTO/PR Ordinance No. 21/2021 and Brazilian PTO/PR Ordinance No. 34/2022. (6 pages).

(Continued)

*Primary Examiner* — Travis R Hunnings

(57) ABSTRACT

A sanitizable audio device for use in neonatal care and method of use are provided herein. The audio device comprises a smooth shell defining an outer surface and an inner surface. The outer surface forms a curved continuous smooth surface. The inner surface supports electronic elements. The shell defines one or more switch apertures, housing one or more actuatable electrical switches, in communication with the electronic elements. The method of use comprises generating on audio output including selecting content that is age appropriate for a particular infant, altering a sound emission of a recording of a care-giver of the particular infant, and programming a music player to emit the audio output below an age dependent volume, for an age dependent number of intervals per day and per week, for an age dependent duration.

20 Claims, 15 Drawing Sheets

Related U.S. Application Data

(60) Provisional application No. 62/552,028, filed on Aug. 30, 2017, provisional application No. 62/396,310, filed on Sep. 19, 2016.

(56) References Cited

U.S. PATENT DOCUMENTS

| | | |
|---|---|---|
| 2005/0225951 A1 | 10/2005 | Kurakami |
| 2006/0194506 A1 | 8/2006 | Sacchetti |
| 2008/0254753 A1* | 10/2008 | Steenstra .................. H04R 5/04 455/39 |
| 2010/0248828 A1* | 9/2010 | Kaing ...................... G09B 5/06 463/31 |
| 2012/0244969 A1 | 9/2012 | Binder |
| 2013/0041661 A1* | 2/2013 | Lee ......................... G10L 15/26 704/235 |
| 2013/0059284 A1 | 3/2013 | Giedgowd, Jr. et al. |
| 2014/0309063 A1 | 10/2014 | Molina |
| 2015/0250978 A1* | 9/2015 | Pelsue ................... A61M 21/02 600/28 |
| 2020/0083856 A1* | 3/2020 | Tin Than ......... G10K 11/17821 |

FOREIGN PATENT DOCUMENTS

| | | |
|---|---|---|
| DE | 20207457 | 9/2002 |
| GB | 2472439 A | 2/2011 |
| JP | H05-93496 A | 12/1993 |
| JP | 2010-517657 A | 5/2010 |
| KR | 2016/0039648 | 4/2016 |
| WO | WO 2015/104222 A1 | 7/2015 |
| WO | WO 2016/138441 A1 | 9/2016 |

OTHER PUBLICATIONS

Final Rejection issued in corresponding Korean application No. 10-2019-7007789, filed Sep. 18, 2017 (7 pages).
Second Final Rejection in corresponding Korean application No. 10-2019-7007789, filed Sep. 18, 2017 (4 pages).
Second Non-Final Rejection issued in corresponding Korean application No. 10-2019-7007789, filed Sep. 18, 2017 (9 pages).
International Search Report and Written Opinion of the International Searching Authority in priority PCT International Application Serial No. PCT/US17/51971 filed Sep. 18, 2017 (10 pages).
Saint-Georges, C., Chetouani, M., Cassel, R, Apicella, F., Mahdhaoui, A. (2013) Motherese in Interaction: At the Cross-Road of Emotion and Cognition? (A Systemic Review). PLoS One 8(10): e78103. https://doi.org/10.1371journal.pone.0078103, Published Oct. 2013.
Kovacs, A.M., and Mehler, J. "*Cognitive Gains in 7-Month-Old Bilingual Infants.*" Proc. Natl. Acad. Sci. U.S.A. (Apr. 2, 20091) 106(16): pp. 6556-6560, doi:10.1073/pnas.0811323106. Published online Apr. 13, 2009.
Kalashnikova, Marina et al. "*Infant-Directed Speech Facilitates Seven-Month-Old Infants' Cortical Tracking of Speech.*" *Scientific Reports*, vol. 8, No. 1, 2018, doi:10.1038/s41598-018-32150-6. Published May 2012.
European Supplementary Search Report dated Apr. 8, 2020 for EP Application No. 17851687 (10 pages).
First Chinese Office Action and translation of First Chinese Office Action for Chinese Application No. 2017800683626 dated Aug. 5, 2020 claiming priority to PCT/US2017/051971 to which the present U.S. Application claims priority (15 pages).
Second Chinese Office Action and translation of First Chinese Office Action for Chinese Application No. 2017800683626 dated Mar. 29, 2021 claiming priority to PCT/US2017/051971 to which the present U.S. application claims priority (9 pages).
Japanese Office Action and translation of Japanese Office action for Japanese Application No. 2019-536476 dated Oct. 7, 2021 (11 pages).
Brazilian Patent Office Preliminary Office Action of Feb. 22, 2022 (7 pages).
European Search Report and Written Opinion dated Feb. 7, 2024, in corresponding European application No. 23204150.9 filed Sep. 18, 2017. (14 pages).
McMahon, Erin et al. Auditory brain development in premature infants: the importance of early experience, Annals of the New York Academy of Sciences, Apr. 23, 2012, pp. 17-27, vol. 1252, No. 1. (8 pages).
Mexican Office Action issued Feb. 20, 2024, in corresponding Mexican application No. MX/a/2019/003082, filed Mar. 15, 2019. (5 pages).
English translation of claims and Mexican Examiner's requirements in Mexican Office Action. (3 pages).
Korean Office Action in corresponding Korean application No. 2023-7036040 issued Jul. 1, 2024. (10 pages).
English translation of Korean Office Action in corresponding Korean application No. 2023- 6036040 issued Jul. 1, 2024. (8 pages).

\* cited by examiner

AUDIO DEVICE AND METHOD OF USE

CROSS REFERENCES TO RELATED APPLICATIONS

The following is a continuation application claiming priority under 35 U.S.C. § 121 to co-pending U.S. nonprovisional application Ser. No. 16/334,459 that was filed on Mar. 19, 2019 and published on Sep. 9, 2021 under publication number US 2021-0280035 entitled AUDIO DEVICE AND METHOD OF USE, which claims priority from a U.S. national phase patent application filed under 35 U.S.C. § 371 claiming priority to international patent application serial number PCT/US17/51971 having a filing date of Sep. 18, 2017 and was published by the International Bureau as publication number WO 2018/053385 on Mar. 22, 2018, which claims priority under 35 U.S.C. § 119 (e) to U.S. Provisional Patent Application Ser. No. 62/396,310 filed Sep. 19, 2016 entitled AUDIO DEVICE AND METHOD OF USE and U.S. Provisional Patent Application Ser. No. 62/552,028 filed Aug. 30, 2017 entitled AUDIO DEVICE AND METHOD OF USE. All of the above identified applications and publications from which priority is claimed are is-incorporated herein by reference in their entireties for all purposes.

TECHNICAL FIELD

The present disclosure generally relates to an audio device, and more particularly to an audio device for use in foe neonatal care to stimulate and sooth infants, preterm infants, and/or premature infants. The audio device is sanitizable and thus, reusable.

BACKGROUND

Research has shown that infants, particularly preterm and premature infants may benefit from audio presented in a developmentally appropriate manner. That is, audio that is not too loud and presented for a limited duration. Generally, preterm and premature infants are housed in small isolettes or cribs, necessitating that an audio device be sized to fit within one of said isolettes or cribs, typically 36"×30" inches. Loud and/or overlong audio may damage an infant's development. Further, preterm and premature infants are susceptible to infection requiring that articles that come into contact with the infants be sanitized to prevent such infection.

SUMMARY

One aspect of the present disclosure comprises a sanitizable audio device for use in neonatal care. The audio device comprises a smooth shell defining an outer surface and an inner surface. The outer surface forms a curved continuous smooth surface, wherein the outer surface of the smooth shell comprises one or more switch apertures. Wherein one or more electrical switches, in communication with electronic elements, extend through the aperture and are flush with the outer surface of the smooth shell. The one or more switches are actuatable through contact. The inner surface of the smooth shell houses the electronic elements, where the electronic elements include a speaker configured to emit audio, a transceiver to send and receive audio signals, and a motion sensor. Wherein, the motion sensor activates the electronic elements to emit audio responsive to detecting movement of the audio device Another aspect of the present disclosure comprises a sanitizable audio device for use in neonatal care. The audio device comprises a smooth ovate shell defining an outer surface and an inner surface. The outer surface forms a curved continuous smooth surface, wherein the outer surface of the smooth ovate shell comprises a deformable region. The deformable region comprises one or more electrical switches, in communication with the electronic elements, are functionally accessible through at least one of touch and proximity. The inner surface of the smooth ovate shell houses the electronic elements. The electronic elements include a speaker configured to emit audio, an electrical circuit to convert an audio signal received by input to the electrical circuit from an aperture into an audio input for the speaker, a microcomputer to maintain a volume of the speaker at a preset level for a preset time, and a power supply to power at least one of the electronic components.

Yet another aspect of the present disclosure comprises a method of emitting an audio output for use in neonatal care includes selecting content that is age appropriate for a particular infant, altering a sound emission of a recording of a care-giver of the particular infant reciting the content to have age appropriate audio parameters to generate the audio output, and programming a music player to emit the audio output below an age dependent volume, for an age dependent number of intervals per day and per week, for an age dependent duration.

Another aspect of the present disclosure comprises a method of using an audio device in neonatal care, foe method comprising selecting age appropriate content for an infant based upon said infant's age, editing a rough audio output comprising a recitation of the selected age appropriate content to comprise an age appropriate amplitude range to generate an audio output and programming a microcomputer of an audio device to emit the audio output through a speaker of the audio device, the Speaker configured to emit the audio output within an age dependent volume. The programming comprising instructing the audio device to emit audio within age dependent parameters, wherein the age dependent parameters comprise the age dependent volume, an age dependent number of intervals per day and per week, and an age dependent duration. The audio device comprising a smooth ovate shell comprising plastic, the smooth ovate shell defining an outer surface and an inner surface, the inner surface of foe smooth ovate shell housing electronic elements comprising the speaker, an electrical circuit to convert an audio signal received by input to the electrical circuit into the emitted audio output from the speaker, the microcomputer, and & battery to power at least one of the electronic components.

While another aspect of the present disclosure comprises a method of using a sanitizable audio device in neonatal care, the steps of the method comprise providing the sanitizable audio device and vertically tilting said audio device to initiate the emission of audio for a preset time. Wherein, the audio device comprises a smooth ovate shell defining an outer surface and an inner surface. The outer surface forms a curved continuous smooth surface, wherein the outer surface of the smooth ovate shell comprises one or more switch apertures wherein one or more electrical switches, in communication with electronic elements, extend through the aperture and are flush with the outer surface of the smooth shell. Wherein, the one or more switches are actuatable through contact. The inner surface of the smooth ovate shell houses the electronic elements, where the electronic elements include a speaker configured to emit audio.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which.

Figure 1:
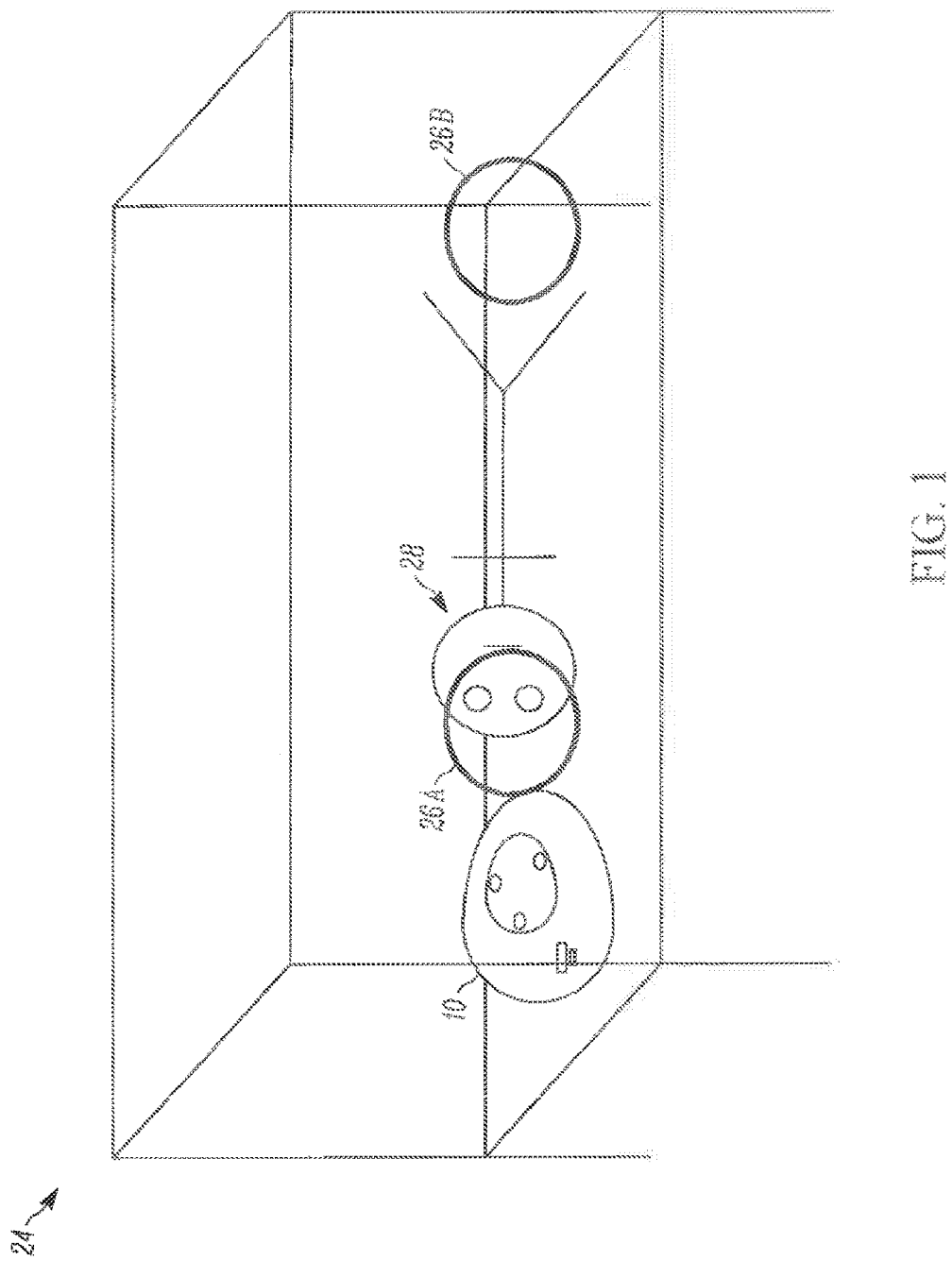
FIG. 1 illustrates a perspective view of an audio device in an isolette in accordance with one example embodiment of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure generally relates to an audio device, and more particularly to an audio device for use in neonatal care to stimulate and sooth infants, preterm infants, and/or premature infants. The audio device is sanitizable and thus, reusable. As used herein, in one example embodiment, the sanitizable audio device 10 comprises a device that, after being exposed to a germicide, is 99.9% free of most common pathogens.

FIG. 1 illustrates an audio device 30 in an isolate 24 with an infant 28. The isolette 24 comprises first and second armholes 26A, 26B typically lined with gloves (not shown) to isolate the infant from contamination. In an illustrated example embodiment, the audio device 10 is sized such that it will easily be removed through one of the first or second armholes 26A. 26B. That is, in one example embodiment, the audio device 10 has an overall greatest diameter of about 10" inches.

Figure 2:
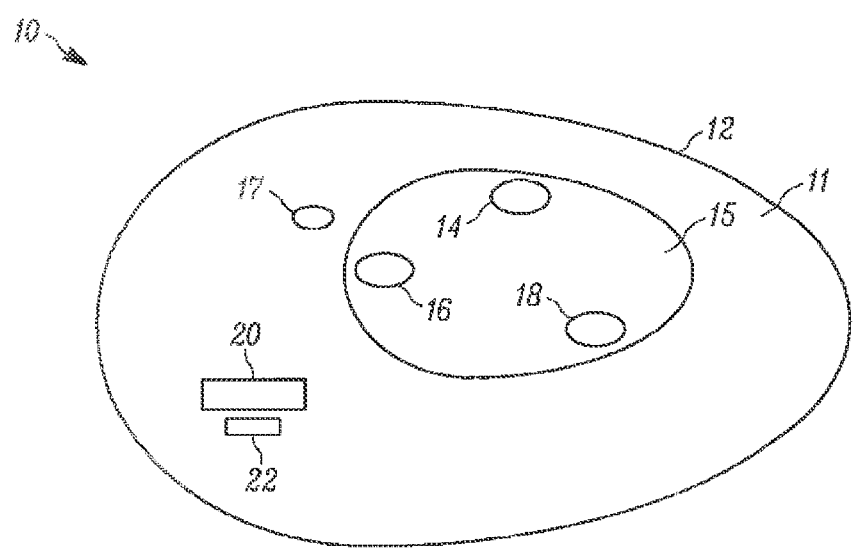
FIG. 2 illustrates a top perspective view of an audio device in accordance with one example embodiment of the present disclosure.
Figure 3:
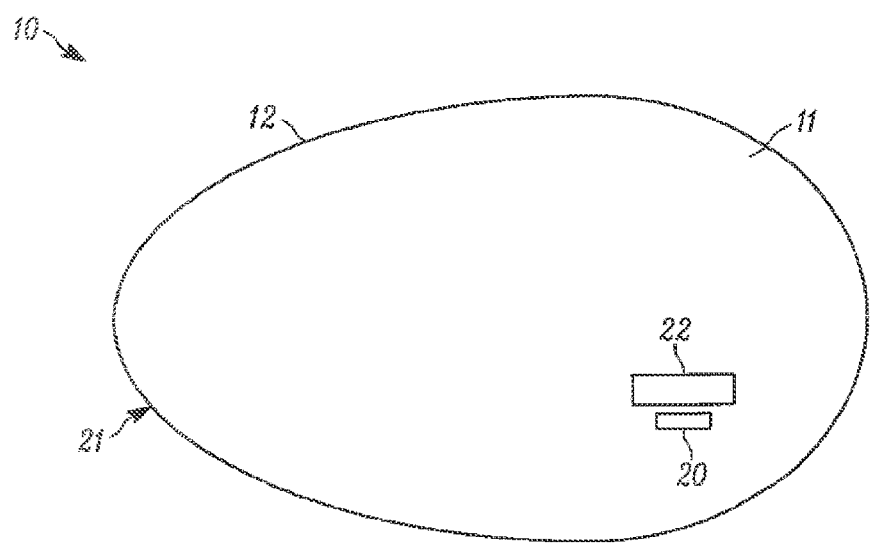
FIG. 3 illustrates a bottom perspective view of an audio device in accordance with one example embodiment of the present disclosure.

Turning to FIGS. 2-3, the audio device 10 comprises a smooth ovate shell 12 defining an outer surface 11 and an inner surface 13 (see FIG. 5B) of the audio device. A suitable material for the smooth ovate shell 12 includes, for example, a rubber-like or pliable polymeric material, such as polypropylene and the like. In one example embodiment, the smooth ovate shell 12 comprises an ellipsoid, a superegg, or a superellipsoid shape. In another example embodiment, the outer surface 11 comprises a smooth surface that is substantially rounded. Stated another way, the smooth outer surface 11 lacks peaks and/or valleys and maintains a substantially Constant curvature. This smooth outer surface 11 prevents the collection of bacteria or viruses in areas they could otherwise thrive. Of course it should be appreciated that the smooth outer surface can have some outer mold flashing or seams, but it is desirable to keep such to the minimum, and such a smooth outer surface is intended to be within the scope of the claims of the present disclosure.

Figure 8:
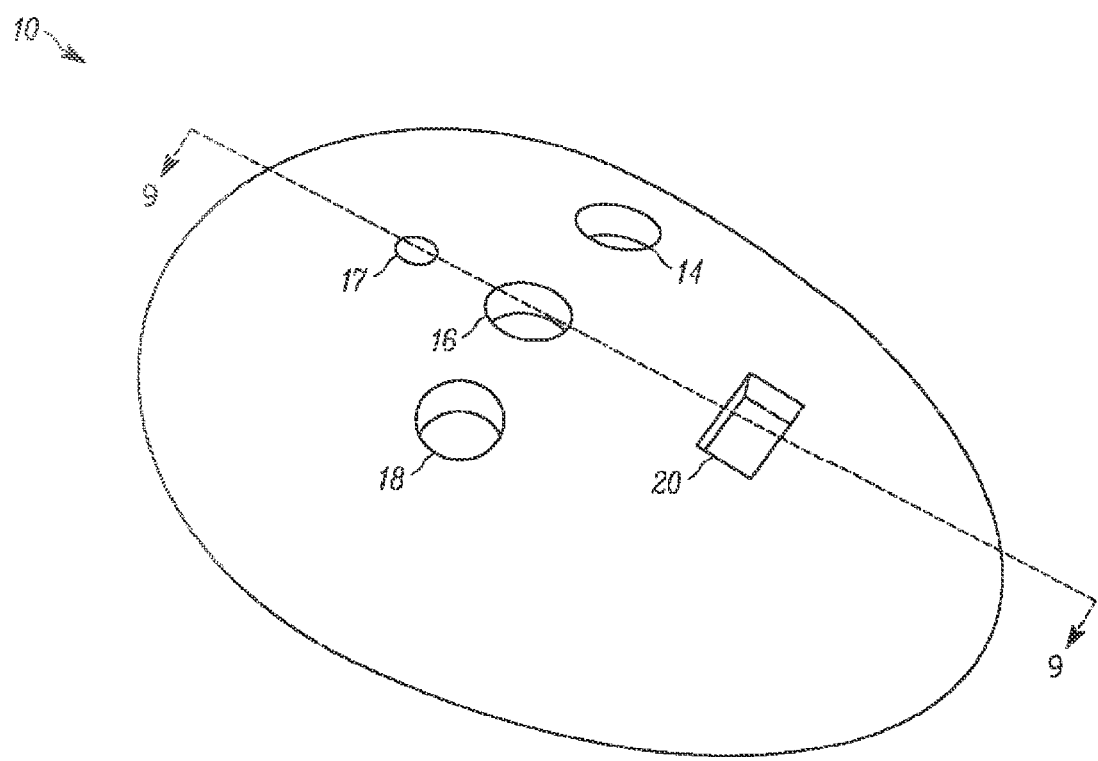
FIG. 8 illustrates a top perspective view of electrical switches and connections formed in a smooth ovate shell of an audio device in accordance with one example embodiment of the present disclosure.

In another example embodiment, a bottom side 21 of the smooth ovate shell 12 comprises a flatter bottom side 54, such that the audio device 10 tends to rest on the flatter bottom side of the smooch ovate shell. As in the illustrated example embodiments of FIGS. 8-10, the smooth ovate shell 12 comprises flatter bottom portion 54 opposite a deformable region 15. In an example embodiment the flatter bottom portion 54 comprises a lesser degree of curvature relative to the rest of the smooth ovate shell 12. The flatter bottom portion 54 does not inhibit rolling of the audio device 10 when a force is applied to the audio device. Movement of the audio device 10 by rolling reduces suffocation hazards of infants, wherein the audio device 10 rolls away from the infant rather than maintaining a position and potentially inhibiting an airway of the infant. In the illustrated example embodiment, the bottom flatter portion 54 comprises a weighted portion 52 (e.g., of a higher density than the smooth ovate shell 12, such as dense plastic, rubber, liquid, sand, etc.) to inhibit rolling of the audio device 10 absent a force acting on the audio device 10.

Figure 9:
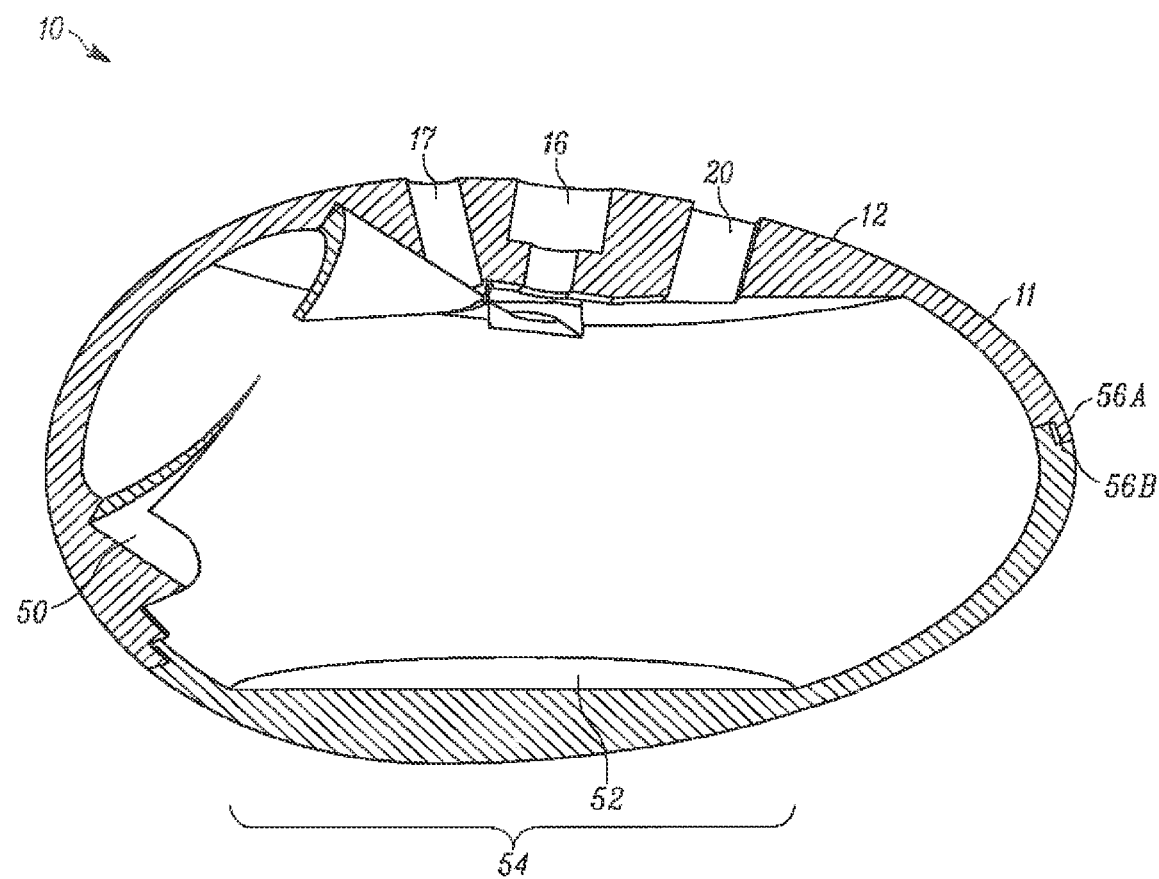
FIG. 9 illustrates a side elevation section view of an audio device of FIG. 8 taken along line 9-9 in accordance with one example embodiment of the present disclosure.
Figure 10:
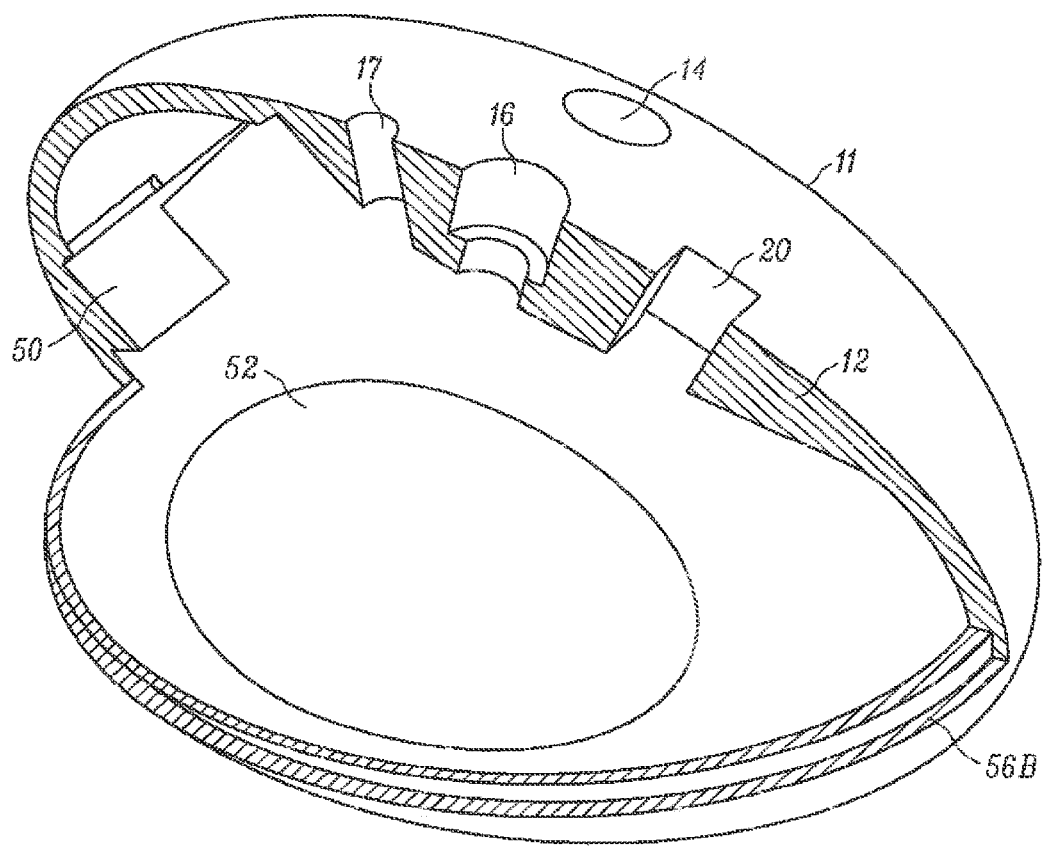
FIG. 10 illustrates a top perspective view of an audio device of FIG. 8 partially taken along line 9-9 in accordance with one example embodiment of the present disclosure.
Figure 11:
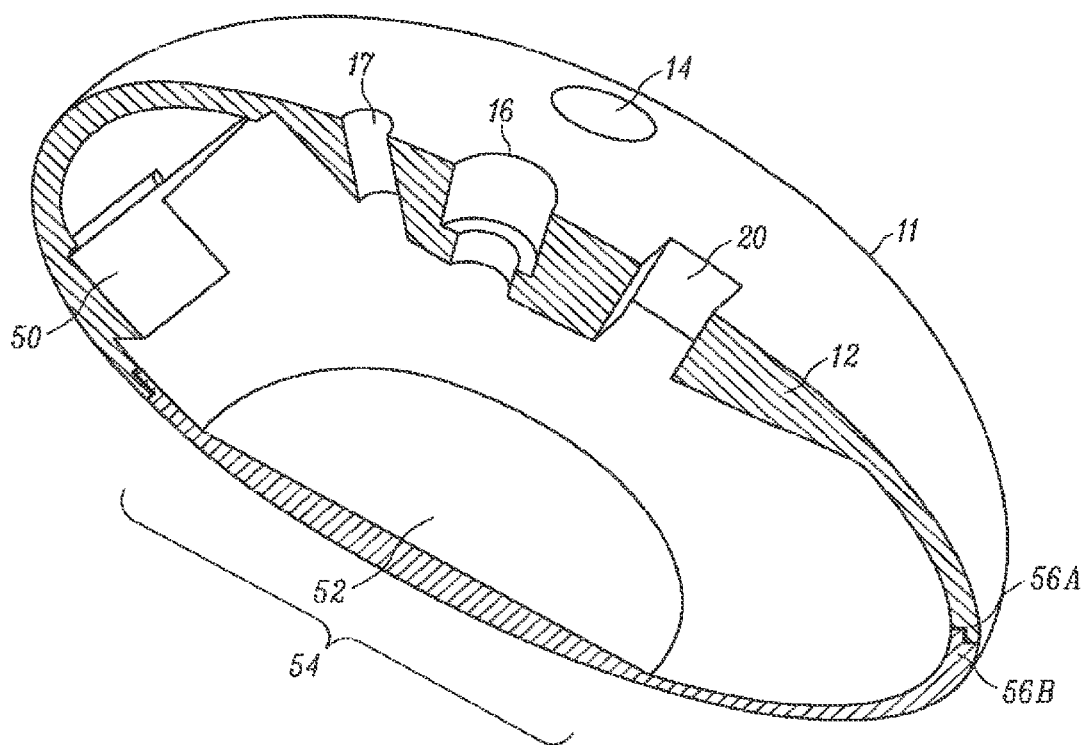
FIG. 11 illustrates a top perspective view of FIG. 9 in accordance with one example embodiment of the present disclosure.

In another example embodiment, the smooth ovate shell 12 comprises a single body, in another example embodiment, such as the embodiments illustrated in FIGS. 9-11, the smooth ovate shell 12 comprises a top body portion 56A that couples to a bottom body portion S6B to form the smooth ovale shell.

Figure 4:
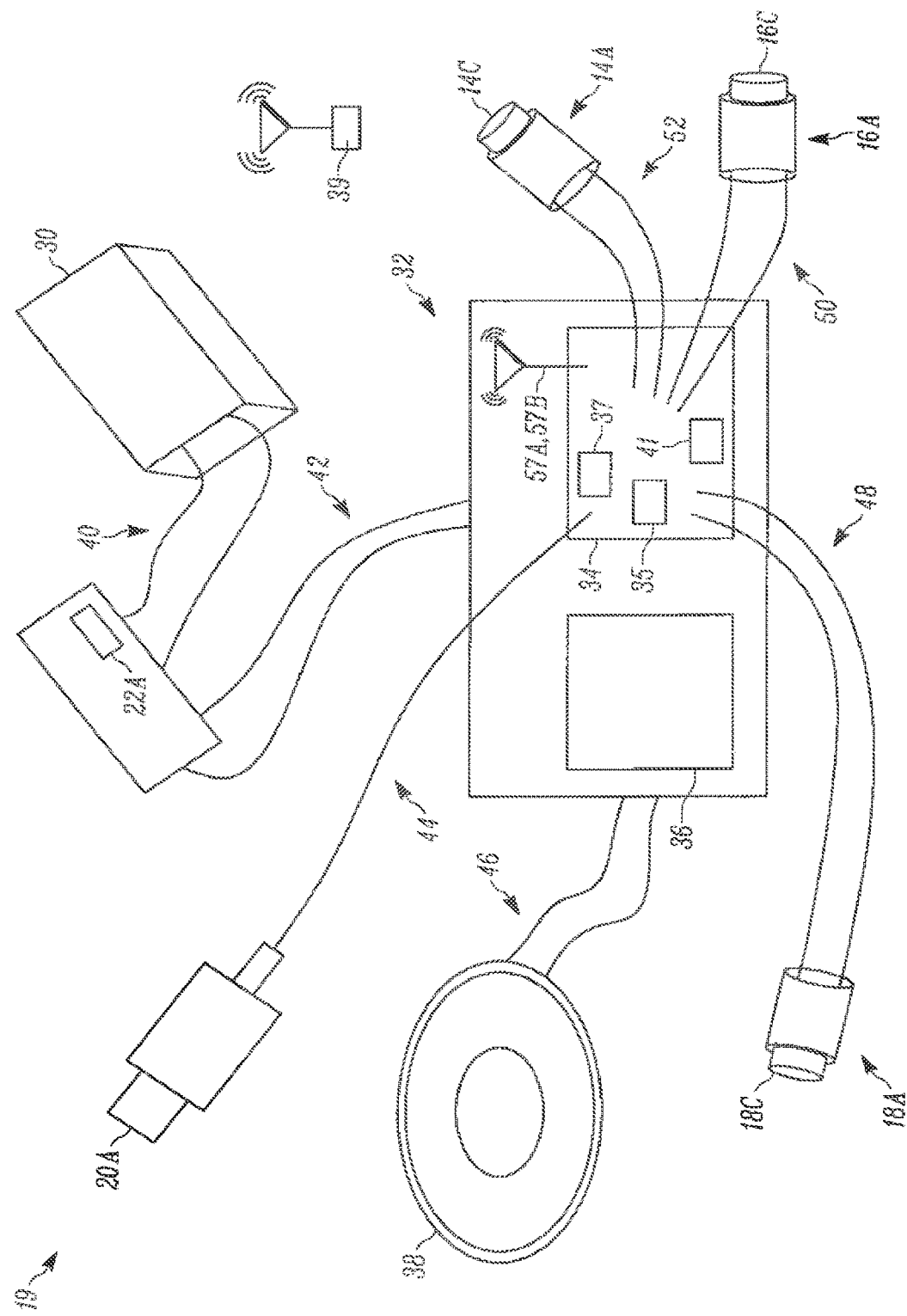
FIG. 4 illustrates an electrical schematic of electrical elements housed in a smooth ovate shell of an audio device in accordance with one example embodiment of the present disclosure.

In another example embodiment, the smooth ovate shell 12 comprises a plurality of spaced apart apertures 20, 22 for accessing electronic components 19, as illustrated in FIGS. 3-4. In the illustrated example embodiment of FIGS. 3-4, a first aperture 20 and a second aperture 22 extend from the inner surface 13 to the outer surface 11. In an example embodiment, the First aperture 20 comprises a USB input 20A and the second aperture 22 comprises a charging input 22A tor the electric components 19. In another example embodiment. Use smooth ovate shell 12 comprises a third aperture 17 to display a light, such as an indicator light. While in another example embodiment, the smooth ovate shell 12 comprise a single aperture, and the single aperture comprises both the charging port and the USB port.

In yet another example embodiment, the smooth ovate shell 12 lacks an aperture. In an example embodiment, the audio device 10 comprises at least one of a short-range wireless interconnection signal receiver 57A and transmitter 57B, wherein audio input is input via the short-range wireless receiver. In one example embodiment, the audio device 10 can be charged via induction coupling, such that the charging port or any opening into the smooth ovate shell 12 is not required, or redundant, and is not present.

Figure 5A:
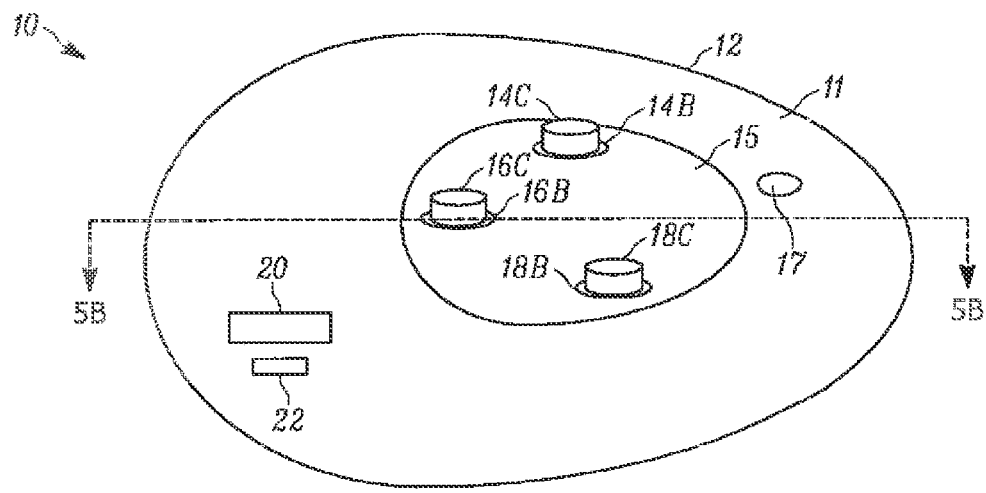
FIG. 5A illustrates a section view of m audio device where electrical switches are visible in accordance with one example embodiment of the present disclosure.
Figure 5B:
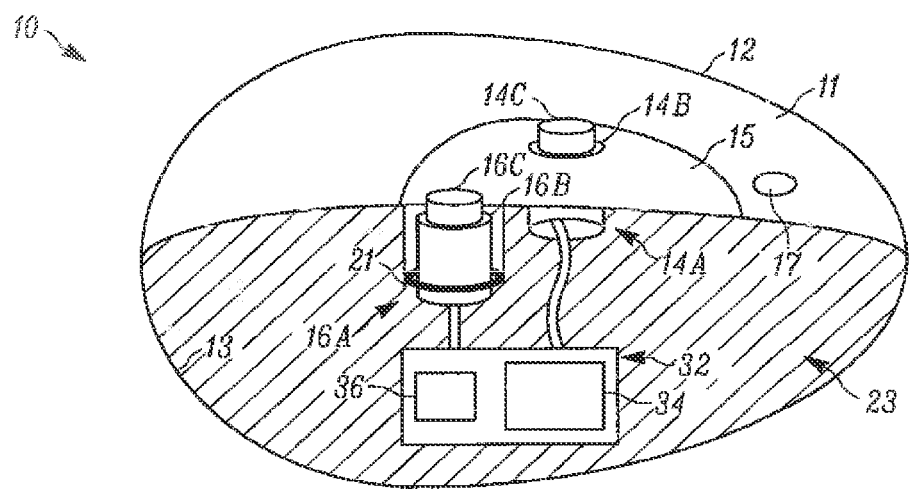
FIG. 5B illustrates an audio device of FIG. 5A taken along line 5B-5B of FIG. 5A in accordance with one example embodiment of the present disclosure.

In the illustrated example embodiments of FIGS. 2, 5A-5B, the outer surface 1) comprises a deformable region 15. In one example embodiment the deformable region 15 comprises one or more electrical switches 14A, 16A, 18A, in electrical communication with the electronic components 19, projecting from the inner surface 13 to the outer surface 11 covered by one or more switch covers 14, 16, 18. The one or more switch covers 14, 16, 18 comprise silicone, molded silicone, a polymer, or some other flexible waterproof and/or water resistant material. The deformable region 15 is formed such that the one or more electrical switches 14A, 16A, 18A are actuatable through the one or more switch covers 14, 16, 18. In one example embodiment, the switch covers 14, 16, 18 comprise a thinner portion of the smooth ovate shell 12, such that a depression of the thinner portion actuates the one or more electrical switches 14A, 16A, 18A. In another example embodiment, a single switch cover covers the deformable region 15. In the illustrated example embodiment, a first switch cover 14 covers foe first switch 14A, a second switch cover 16 covers the second switch 16A, and/or a third switch cover 18 covers the third switch 18A. The one or more switch covers 14, 16, 18, are, in one example embodiment, formed from pliable material molded with the smooth ovate shell 12, such that the material forming the one or more switch covers is flexible and/or thin enough to deform allowing the activation of the respective switch. The smooth ovate shell 12 and the one or more switch covers 14, 16, 18 form a continuous body that may be sanitized utilizing sanitizing wipes, such as alcohol or bleach based sanitizing wipes.

In a second example embodiment, the smooth ovate shell 12 is formed over the deformable region 15. Wherein the smooth ovate shell 12 is continuous over the deformable region 35 at least one of the one or more electrical switches 14A, 16A, 18A comprises a sensor, such as a proximity sensor. Wherein the proximity sensor merely requires a user to be in a first proximity (e.g., such as 1 mm) of one of foe electrical switches 14A, 16A, 18A to activate a functionality associated with said switch. The proximity sensor does not require touch for functionality. In another example embodiment, wherein the smooth ovate shell 12 is continuous over the deformable region 15, the electrical switches 14A, 16A, 18A are associated with the short-range wireless interconnection signal, wherein the functionality associated with a given switch can be activated utilizing a device that, communicates via the short-range wireless interconnection signal.

Turning to FIG. 4, the electrical components 19 of one example embodiment are illustrated, in the illustrated example embodiment, the electronic components 19 comprise e speaker 38 configured to emit audio, an electrical circuit 34 to convert an audio signal received through the first aperture 20 and/or a short-range wireless interconnection signal into an audio input for the speaker 38, a microcomputer 32 to maintain a volume of the speaker 38 at a preset level for a preset duration and communicate with the circuit 34, and a power supply, such as a battery 30 to power at least one of the electronic components. In another example embodiment, the electronic components 19 comprise a light source (not shown), such as a light emitting diode indicating that one or more features of the audio device 10 are functioning. In another example embodiment, the preset level of the volume is between 40-60 decibels. In yet another example embodiment, the preset level of the volume is 55 decibels. In an example embodiment, the preset duration is between 15 to 25 minutes over an eight (8) to twenty four (24) hour period, regardless of skipping, fast forwarding, and/or rewinding. In another example embodiment, the preset duration is 20 minutes, regardless of skipping, fast forwarding, and/or rewinding.

In one example embodiment, the speaker 38 may comprise a small box speaker, one example of a suitable small box speaker includes Dayton Audio CE38M-8 1-½" Mini Speaker 8 Ohm manufactured by Dayton Audio™. In an example embodiment, the microcomputer 32 comprises a microprocessor, one such example microprocessor would be SainSmart Nano v. 3.0 manufactured by SainSmart™. In an example embodiment, the electrical circuit 36 may comprise a printed circuit board (PCB) consisting of an application specific integrated circuit, one such PCB would be a prototyping board having an item number: G19388. In an example embodiment, the microcomputer 32 comprises an MP3 piayer 36. The MP3 player 36 is in electrical communication with other elements of the electrical components 19, such as the circuit 34, the speaker 38, the one or more switches 14A, 16a, 18a, and/or the battery 30.

In one example embodiment, the MP3 player 36 stores and play audio, one such MP3 player would be DiyMall Mini MP3 player manufactured by DiyMall™. In this example embodiment, the battery 30 provides power to the electrical components 59 for a duration over 10 hours, one such battery 30 is a lithium ion battery. It would be appreciated by one of ordinary skill in the art that many different speaker, microcomputer, circuit, and/or battery types can be utilized in this application.

In the illustrated example, the audio input for the speaker 38 comprises the USB port 20A that is accessible through the first aperture 20. The USB port 20A is in wired communication 44 with an input/output (I/O) port of the microcomputer 32. In the illustrated example, the charging input 22A for the battery 30 is in wired communication 40, 42 with the microcomputer 32 and the battery 30, respectively. The speaker 38 is in wired communication 46 with an I/O port of the microcomputer 32. In an example embodiment, the speaker 38 is in direct wired communication with the MP3 player 36.

The one or more switches 14A, 16A, 18A illustrated in FIGS. 4, 5A, and 5B are in wired communication 48, 50, 52 with one or more I/O ports of the microcomputer 32. In one example embodiment, actuation of a first switch 14A turns audio on or off actuation of a second switch 16A fast forwards the audio, and actuation of a third switch 18A rewinds the audio. It would be appreciated by one of ordinary skill in the art, that the one or more switches 14A, 16A, 18A may perform multiple functions in response to actuation, such as altering an interval setting of the audio, a volume of the audio, etc. In another example embodiment, the interval setting of the audio comprises a number of times per day the audio is emitted. In yet another example embodiment, the interval setting can be altered based upon an age and/or developmental stage of the infant 28. The interval setting can be between 1 to 4 times per day, with more intervals per day for older infants.

In one example embodiment, the actuation of the one or more switches 14A, 16A, 18A comprises depressing a top portion 14C, 16C, 18C of the one or more switches, through the one or more switch covers 14, 16, 18, wherein the top portion, absent a depressive force, returns to an un-depressed condition. In another example embodiment, the top portion 14C, 16C, 18C of the one or more switches 14A, 16A, 18A extends past the outer surface 11 of the smooth ovate shell 12.

The depressing of the top portion 14C, 16C, 18C of the one or more switches 14A, 16A, 18A sends a signal to the microcomputer 32 to perform a function associated with its respective switch. In one example embodiment, the one or more switches 14A, 16a, 18a are actuatable switches, one such switch would be a silicon switch. In another example embodiment, responsive to a user actuating the first switch 14A, comprising an "ON" button, the microcomputer 32 will activate and provide power to the audio device IQ, from the battery 30 for the preset duration. Thus, the audio device 10 draws power for the preset duration, but not longer, lengthening a time between charges of the battery 30. Additionally, the battery 30 enables the audio device 30 to be cordless, preventing dangers associated with cords, such as the infant becoming fatally tangled or constricted by a cord inside the isolette or crib.

In another example embodiment, the electrical components 19 found on the electrical circuit 34 comprise a motion sensor 35, such as a gyroscope, a reed switch, a mercury switch, or the like. The motion sensor 35, in wired communication with the microcomputer 32, senses movement of the audio device 30, such as a shake or a tilt. Responsive to receiving a communication indicating the motion sensor senses a tilt or staking, me microcomputer 32 will activate and provide power to the audio device 10, in one example embodiment, responsive 10 receiving a communication indicating the motion sensor senses the tilt or shaking while the audio device 30 is activated, the microcomputer 32 will terminate power to the audio device.

In one example embodiment, the electronic components 19 illustrated in FIG. 4 comprise an interlace 37 in wired communication with an I/O port of the microcomputer 32. The interface 37 can be used to alter a duration, a decibel level, a play per day interval of the audio, and/or other assigned functions of the one or more switches 14A, 16A, 185A and/or other inputs (e.g., such as through the first or second apertures 20, 22, or through wireless communication, such as with a cloud system, a computer, etc.). Additionally the interface 37 can be used to select one or more audio selections stored on the MP3 player and/or on a USB drive connected to the USB port 20A. In another example embodiment, the interface 37 is presented on a secondary device 39 in communication with the audio device 10 via the short-range interconnection signal.

In one example embodiment, the electronic components 19 comprise a microphone 41. The microphone 41 monitors audio levels in the environment surrounding the audio device 10. The microcomputer 32 may identify an ambient decibel level in the environment surrounding the audio device 10 and adjust the decibel level of the audio output by the speaker 38, such that a combined decibel level of the audio output and the environment combined are at or near the preset decibel level. That is, the microphone 41 provides the microcomputer 32 with a decibel level of ambient sound, so that an absolute decibel level of audio heard by an infant is at a developmentally appropriate decibel level (e.g., the preset decibel level).

In the example embodiment illustrated in FIGS. 5A and 5B, the one or more switches 14A, 16A, and 18A are visible in the deformable region 15, as the one or more switch covers 14, 16, 18 are not present. In FIG. 5B some electrical components 19 are not illustrated for clarity. In another example embodiment, the one or more switches 14A, 16A, 18A protrude through switch apertures 14B, 16B, 18B formed in the smooth ovate shell 12.

In the illustrated example embodiment of FIGS. 9-11, internal structures 21 housed within and connected to the smooth ovate shell 12 support the one or more switches 14A, 16A, 18A, such that the one or more switches 14A, 16A, 18A maintain a position protruding through the switch apertures 14B, 16B, 18B in the smooth ovate shell 12. In another example embodiment, the electrical components 19 are secured to a shelf 50 (see FIGS. 9-11) within the smooth ovate shell 12. It will be appreciated by one of ordinary skill in the art that many internal structures can be used to secure the one or more switches 14A, 16A, 18A. In another example embodiment, the electrical components 19 housed within the smooth ovate shell 12 are packed with electronic packaging to maintain individual electrical component positions within the smooth ovate shell. In yet another example embodiment the electronic packaging is shock absorbent. While in one example embodiment, the electrical packing provides shock absorption for the electrical components 19. In an example embodiment, a combination of the shock absorption properties of the smooth ovate shell 12 and the electrical packing increases a durability of the audio device 10. In another example embodiment, the smooth rounded shape of the smooth ovate shell 12 absorbs shock through the shell, such that minimal shock is transmitted to the electronic components 19. As the audio device 10 may be dropped when being removed from the isolette or crib 24, durability of the audio device is an important factor for use.

The audio device 10 allows for a safe delivery of parent's voices to infants when parents cannot be with the infant. Infant-directed speech sounds are known to improve language development of said infants. At many hospitals parental visitation happens infrequently and for small time periods. The audio device 10 allows infants to receive their parents' speech, such as when prerecorded on a USB drive, in a safe and developmentally appropriate manner. Further, because the audio device 10 may be programmed to emit audio at the preset decibel level, for the preset duration, and at the preset intervals, inappropriate (e.g., too loud, too long, too frequent) sound exposure can be avoided. Inappropriate sound exposure can damage brain development of infants.

Figure 6:
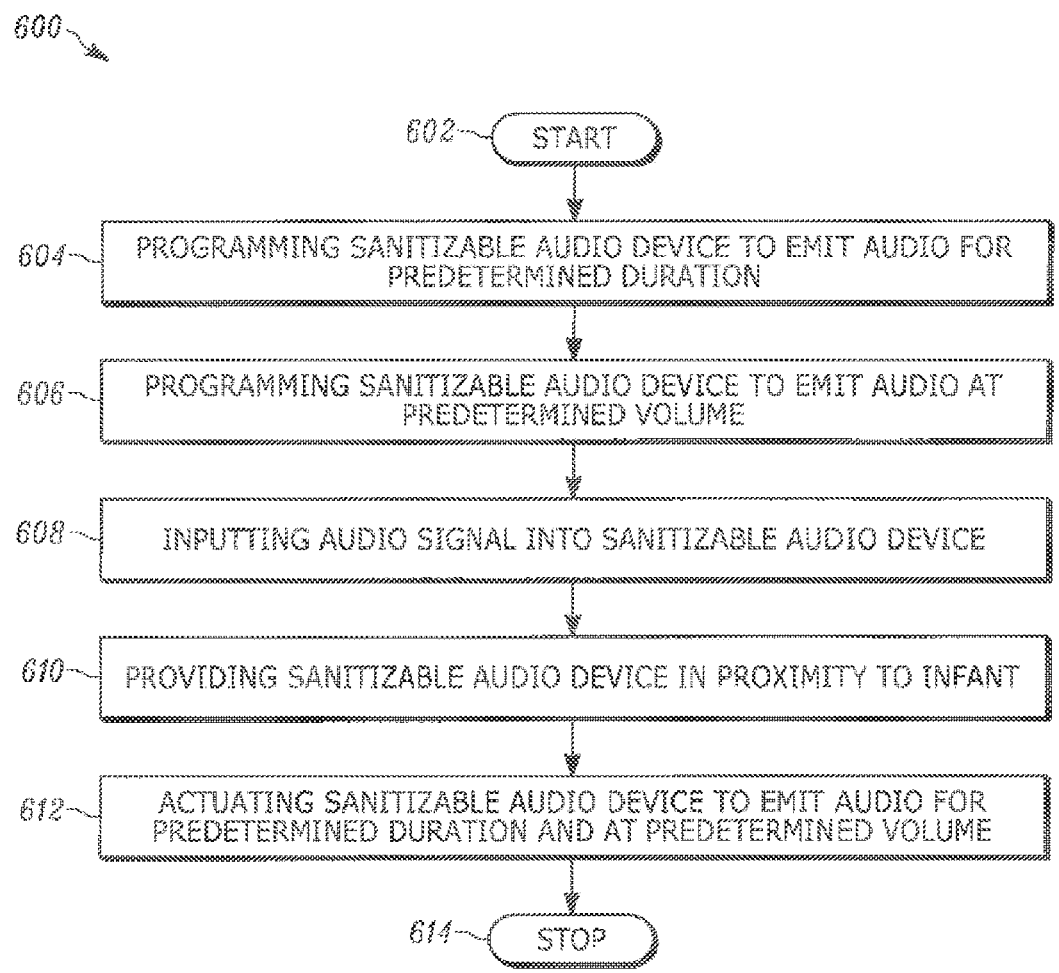
FIG. 6 illustrates a flow diagram for a method of using an audio device in accordance with one example embodiment of the present disclosure.

Turning to FIG. 6, a method 600 of using the audio device 10 is disclosed. At 602, the method 600 starts. At 604, the audio device 10 is programmed to emit audio for a predetermined duration (e.g., 20 minutes). At 606, the audio device 10 is programmed to emit audio at a predetermined volume (e.g., 55 decibels). In one example embodiment, the audio device 10 is programmed through the microcomputer 32. At 608, an audio signal is input into the audio device 10. In another example embodiment, the audio signal is input through one of the USB port 20A or the MP3 player 36. At 610, the audio device 10 is provided in proximity to the infant 28. At 612, the audio device 10 is actuated to emit audio for the predetermined duration and at the predetermined volume. The audio is emitted through a speaker 38, and live audio device 10 is actuated through one or more switches 14A, 16A, 18A. At 614, the method 600 stops.

Figure 7:
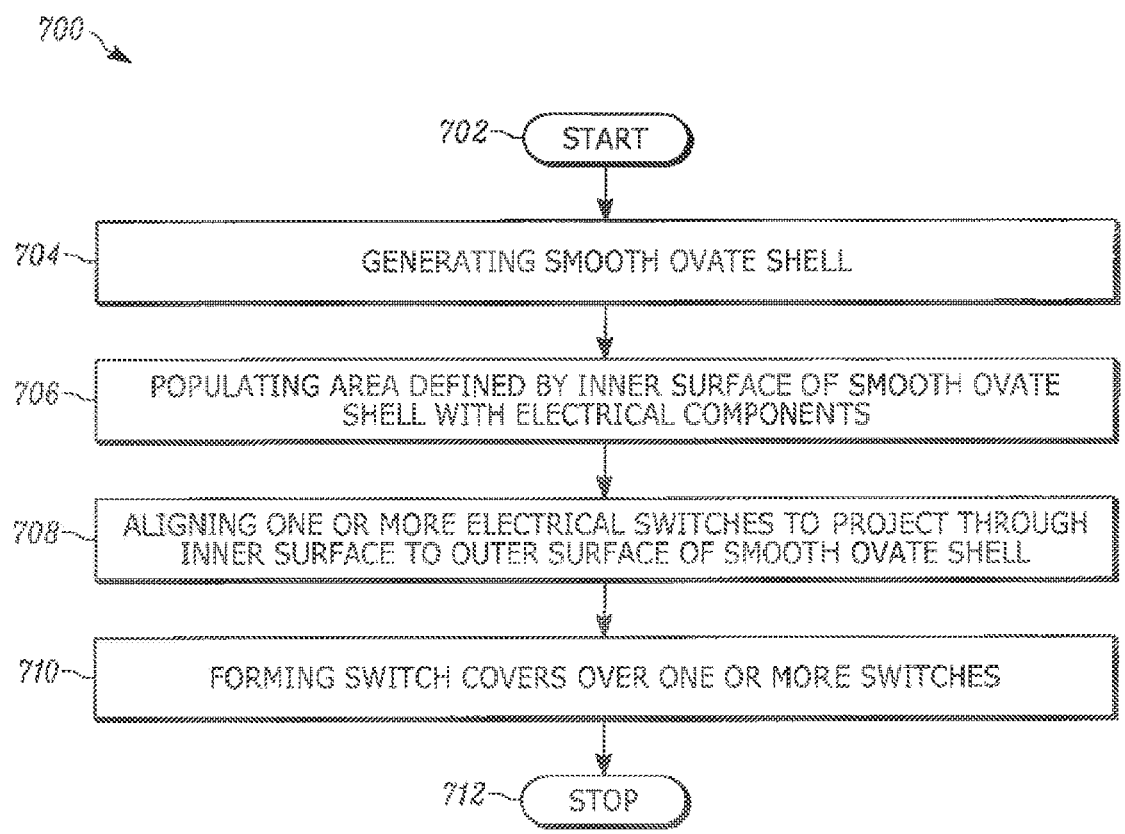
FIG. 7 illustrates a flow diagram for a method of forming an audio device in accordance with one example embodiment of the present disclosure.

Turning to FIG. 7, a method 700 of forming the audio device 10 is disclosed. At 702, the method 700 starts. At 704, the smooth ovate shell 12 is generated. In one example embodiment, the smooth ovate shell 12 is generated by at least one of 3D printing, molding, or the like. In an example embodiment, the smooth ovate shell 12 is formed to comprise one or more apertures 20, 22, and one or more switch apertures 14B, 168, 18B. At 706, an area defined by the inner surface 13 of the smooth ovate shell 12 is populated with the electrical components 19. In another example embodiment, the populating includes aligning the USB port 20A with the first aperture 20 and the charging port 22 with the second aperture 22A. At 708, the populating includes aligning the one or more switches 14A, 16A, 18A with the one or more switch apertures 14B, 16B, 18B, such that top portions 14C, 16C, 18C of the one or more switches protrude through the smooth ovate shell 12. In an example embodiment, the area 23 defined by the inner surface 13 comprises electric packing and internal structures 21 to support the electronic components 19. At 710, one or more switch covers 14, 16, 18 are formed. The one or more switch covers 14, 16, 18 cover the one or more switches 14A, 16A, 18A and form a continuous body with the smooth ovate shell 12. At 712, the method 700 stops.

Figure 12A:
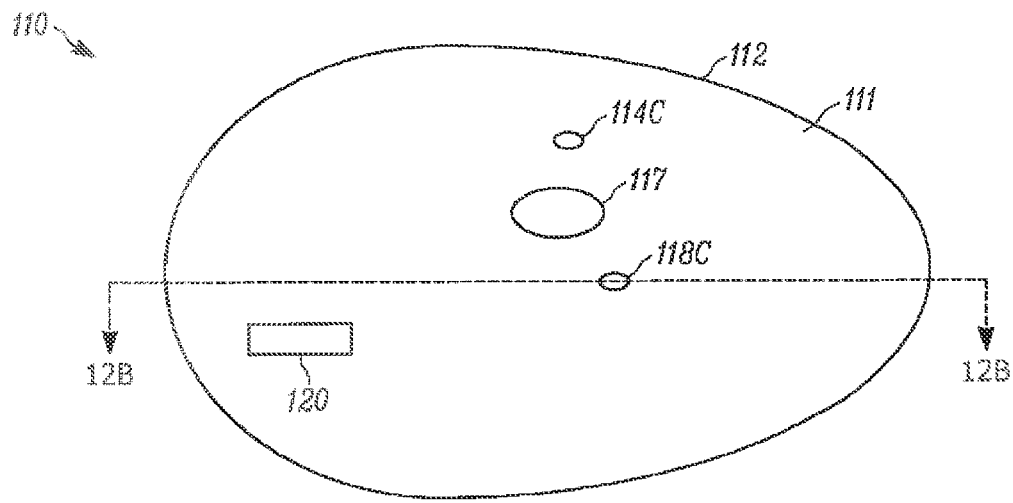
FIG. 12A illustrates a top perspective view of an audio device in accordance with a second example embodiment of the present disclosure.
Figure 12B:
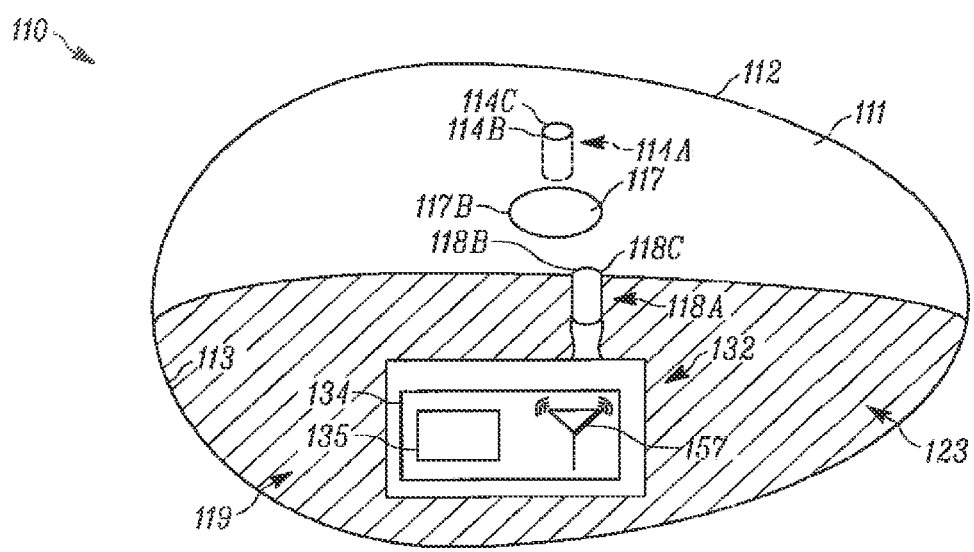
FIG. 12B illustrates an audio device of FIG. 12A taken along line 12B-12B of FIG. 12A in accordance with a second example embodiment of the present disclosure.
Figure 13:
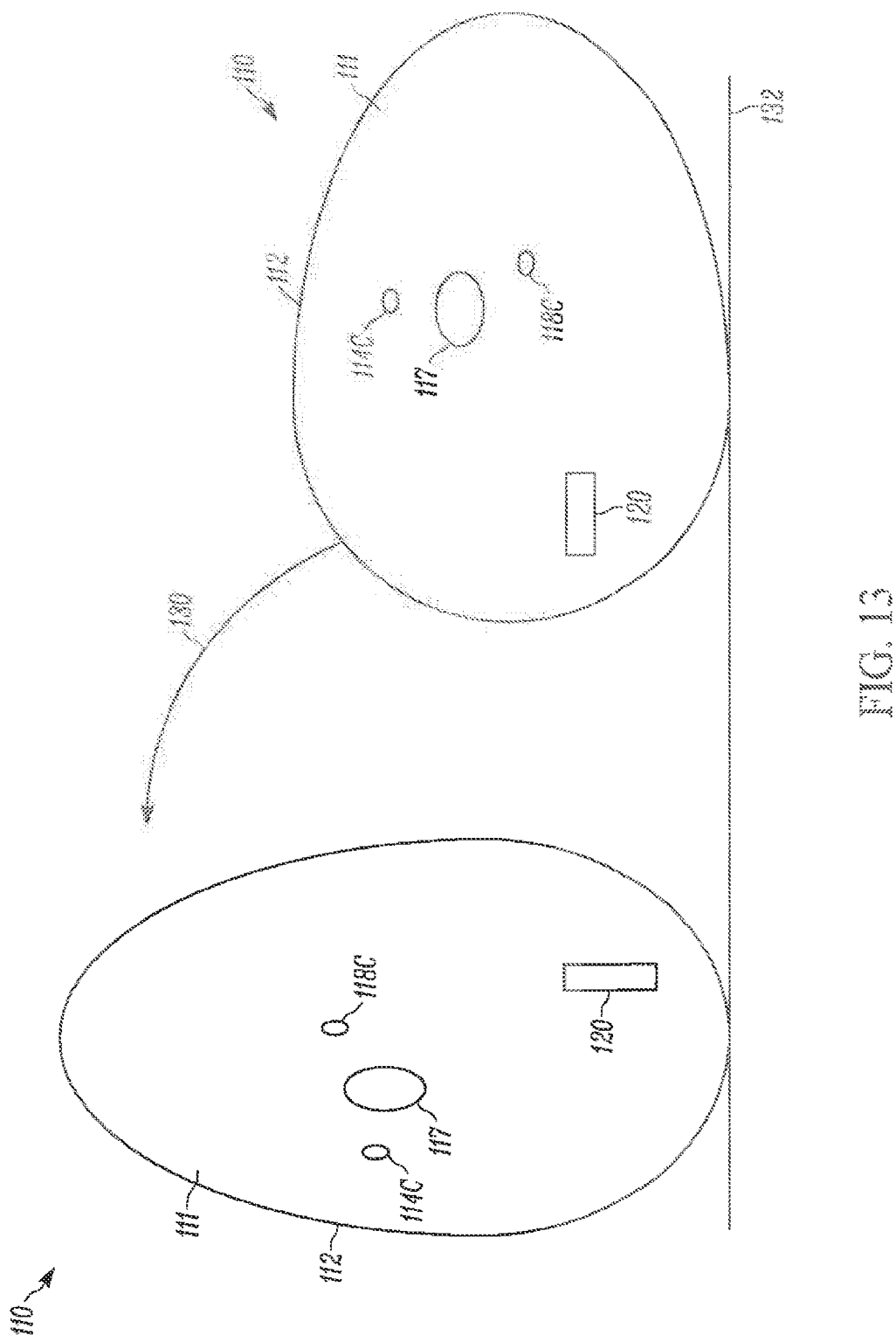
FIG. 13 illustrates a vertical tilt of an audio device in accordance with a second example embodiment of the present disclosure.

Turning to FIGS. 12A, 12B, and 13, a second embodiment of the audio device 110 is illustrated. Features of the audio device 110 illustrated in FIGS. 12A, 12B, and 13, that are similar to tire features of the audio device 10 illustrated in FIGS. 1-5B will be identified by like numerals increased by a factor of one-hundred.

The audio device 110 of FIGS. 12-13 is substantially similar to the audio device 10 of FIGS. 1-5B, with a notable difference being that top portions 114c, 118c of the one or more switches 114a, 118a are flush with the smooth ovate shell 112 of the audio device 110. In one example embodiment, the one or more switches 114a, 118a extend through one or more switch apertures 114B, 118B, but do not protrude beyond an outer surface 111 of the smooth ovate shell 112. In one example embodiment, the one or more switches 114a, 118a are laterally Hush with the one or more switch apertures 114B, 118B. That is, the top portions 114c, 118c or the one or more switch apertures 114B, 118B abut and are contiguous with the one or more switch apertures 114B, 118B such that there are minimal crevasses and/or peaks. In another example embodiment, the one or more switches 114a, 118a comprise a touch sensitive switch, such as a touch capacitive switch, in the illustrated example embodiment of FIG. 12B, a first switch 114A and a second switch 118A of the one or more switches comprise a pin shape.

In one example embodiment, response to the audio device 110 detecting a touch of the first switch 114A, a forward shuffle function is initiated, such that audio emission is fast forwarded or a first audio recording is skipped and a second audio recording is emitted. In another example embodiment, responsive to the audio device 110 detecting a touch of the second switch 118A, a reverse shuffle function is initiated, such that the audio emission is rewound or the second audio recording is skipped and the first audio recording is emitted. The initiation of the forward or reverse shuffle function does not extend or reduce the preset duration. One of ordinary skill in the art would understand that alternate functions can be associated with the first and second switches 114A, 118A.

As in the illustrated example embodiment of FIG. 13, the emission of audio is instigated by vertically tilting 130 the audio device 110. In this example embodiment, the vertically tilting 130 comprises tilting the audio device 110 such that a head or butt of the ovate shell 112 is moved 90° away from a surface 132 that the audio device is resting on. In another example embodiment, the electrical components 119, as illustrated in FIG. 4 as electrical component 19, comprises a motion sensor 135, such as a gyroscope, a reed switch, a mercury switch, or the like, dial senses a relative position of the audio device 110 (see FIG. 12B). In the illustrated example embodiment, an electrical circuit 134 is in wired communication with the motion sensor 135. Please note, in FIG. 12B some electrical components 119 are not illustrated for clarity.

In the illustrated example embodiment of FIG. 12B, the electrical components 119 comprise a short-range interconnection signal transceiver 157 to send and receive audio inputs. In this embodiment, a sole aperture 120 is present in the smooth ovate shell 112. The first aperture 120 is utilized for charging the audio device 110. In another embodiment, the first aperture 120 is an audio input port (e.g., a USB port) and a charging port. In yet another example embodiment, the first aperture 120 is not present, and the audio device 110 is charged via induction charging.

Figure 14:
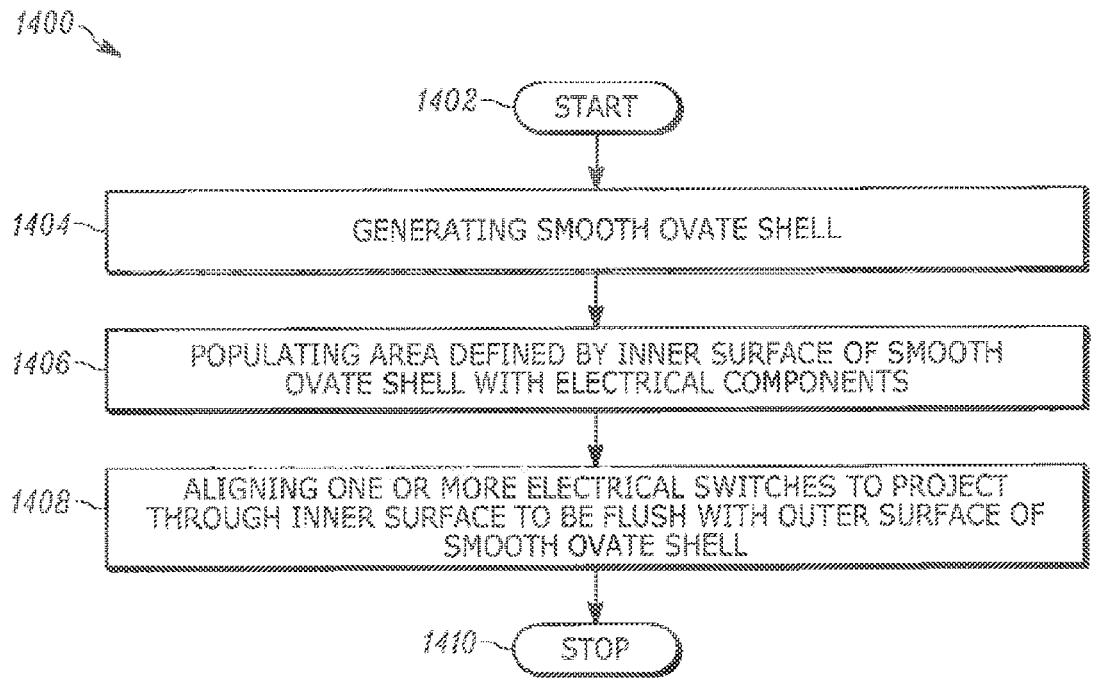
FIG. 14 illustrates a flow diagram for a method of forming an audio device in accordance with a second example embodiment of the present disclosure.

Turning to FIG. 14, a method 1400 of forming the audio device 110 is disclosed. At 1402, the method 1400 starts. At 1404, the smooth ovate shell 112 is generated. In one example embodiment, the smooth ovate shell 112 is generated by at least one of 3D printing, molding, or the like. In another example embodiment, the smooth ovate shell 112 is formed to comprise one aperture 120 and one or more switch apertures 114B, 118B. At 1406, an area defined by an inner surface 113 of the smooth ovate shell 112 (see FIG. 12B) is populated with the electrical components 119. At 1408, the populating includes aligning a charging port with the aperture 120. In yet another example embodiment, the populating includes aligning the one or more switches 114A, 118A with the one or more switch apertures 114B, 118B, such that the top portions 114C, 118C of the one or more switches are flush with and abut the outer surface 111 of the smooth ovate shell 112. At 1410, the method 1400 stops.

Another embodiment is contemplated, wherein the audio device 110 is utilized to entertain/stimulate a pet, such as a dog. The audio device 10, 110 (e.g., playing a dog owner's voice when activated) will help reduce anxiety in pets, as well as stimulate the pet. It would be appreciated by one having ordinary skill in the art that the smooth ovate shell 12, 112 would comprise a thicker/tougher material to prevent damage to internal components from play and/or bites by the pet.

Figure 15:
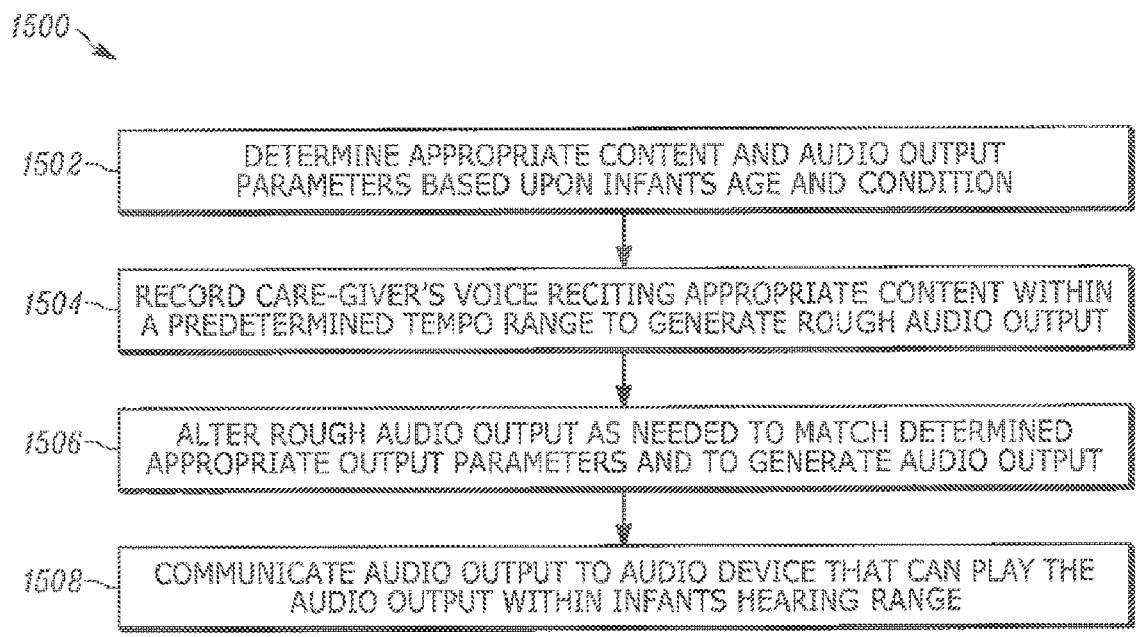
FIG. 15 illustrates a flow diagram for a method of using an audio device in accordance with a third example embodiment of the present disclosure.

Turning to FIG. 15, a method 1500 of matching audio output parameters and content to a developmental stage of the infants brain and body is disclosed. Matching the audio output comprises adjusting an amplitude of emitted sound, a frequency, a rhythm, a melodic contour, and/or a sound envelope of a rough audio output. Additionally, the content is selected based upon an emotional context of the sound (e.g., upbeat and happy when interaction and energy will be promoted, slow and mellow when sleep will be promoted, etc.). Brains activate in response to language, and brain activation is mirrored between a speaker and a listener, thus, developmentally appropriate content comprises an individualized, infant-targeted speech sound that increases/stimulates brain activation in the infant.

At 1502, appropriate content and audio output parameters are determined based upon a particular infant's age and condition (e.g., illnesses, developmental delays, etc.). The audio output parameters based upon infant's age is disclosed in an age based parameters table below:

| AGE BASED CHART FOR MUSIC CONTENT FOR MUSIC PLAYER | | |
|---|---|---|
| Infant's Age | | Audio Output Parameters |
| 28-29 PMA start to 32 PMA | Total time per day: | 20 minutes |
| | Total time per week: | 3 to 4 times a week |
| | Appropriate content: | Simple songs with only 2 to 3 chords |
| | | Accapella - single voice |
| | | Sung at less than 60 bpm |
| | | Range of melody only 1 octave. |
| | | Stepwise melody, no intervals over a third. |
| | Volume: | Played at less than 55 dB on scale C |
| 32 PMA-36 PMA | Duration per audio emission: | 20 minutes |
| | Total time per day: | No more than 6 times per day (totaling 3 hours) |
| | Duration of silence: | at least 30 minutes |
| | Total time per week: | 5 days a week |
| | Appropriate content: | Simple songs with no more than 4 chords |
| | | Single voice and single instrumentation |
| | | Instrumentation played single notes not chords |
| | | Range of melody only 1 octaves. |
| | | Melody with no intervals over a 6th. |
| | Appropriate tempo: | Sung and played at less than 60 bpm. |
| | Volume: | Played at less than 55 dB on scale C |
| 36 PMA-40 PMA | Duration per audio emission: | 30 minutes |
| | Total time per day: | No more than 8 times per day (totaling 4 hours) |
| | Duration of silence: | Must have at least 30 minutes |
| | Total time per week: | 7 days a week |
| | Appropriate content: | Single voice and single instrumentation |
| | | Instrumentation must play single notes not chords |
| | | Range of melody only 1 octaves. |
| | | Melody with no intervals over a 6th. |
| | Appropriate tempo: | Sung and played at less than 60 bpm. |
| | Volume: | Played at less than 55 dB on scale C |
| 0 to 3 months | Duration per audio emission: | 30 minutes at a time |
| | Total time per day: | No more than 8 times per day (totaling 4 hours) |
| | Duration of silence: | Must have at least 30 minutes |
| | Total time per week: | 7 days a week |
| | Appropriate content: | Single voice and single instrumentation |
| | | Instrumentation can be multiple notes at once |
| | | No restrictions on melody range |
| | Appropriate tempo: | Sung and played at a more upbeat tempo between 60 to 120 bpm to promote playful mood |
| | Appropriate tempo: | Sung and played at less than 60 bpm to promote relaxation and sleep. |
| | Volume: | Played at less than 65 dB on scale C. |
| 3 to 6 months | Duration per audio emission: | 30 minutes at a time |
| | Total time per day: | No restrictions |
| | Duration of silence: | at least 30 minutes |
| | Total time per week: | Multiple voices and instrumentation (limit to 4) |
| | Appropriate content: | Recommend no sudden changes or sounds. |
| | | No restrictions on melody range |
| | Appropriate tempo: | Sung and played at a more upbeat tempo between 60 to 120 bpm to promote playful mood |

AGE BASED CHART FOR MUSIC CONTENT FOR MUSIC PLAYER

| Infant's Age | | Audio Output Parameters |
|---|---|---|
| 6 to 12 months | Appropriate tempo: | Sung and played at less than 60 bpm to promote relaxation and sleep. |
| | Volume: | Played at less than 75 dB on scale C. |
| | Duration per audio emission: | 45 minutes at a time |
| | Total time per day: | No restrictions on how many times per day. |
| | Duration of silence: | Recommend at least 30 minutes |
| | Total time per week: | 7 days a week |
| | Appropriate content: | Multiple voices and instrumentation No restrictions on instrumentation or melody |
| | Appropriate tempo: | Sung and played at a more upbeat tempo between 60 to 120 bpm to promote playful mood |
| | Appropriate tempo: | Sung and played at less than 60 bpm to promote relaxation and sleep. |
| | Volume: | Played at less than 85 dB on scale C. |

In one example embodiment, a medical profession (e.g., a music therapist) provides a care-giver (e.g., a parent, guardian, nurse, etc.) of the infant with an education about appropriate audio output parameters for their infant. When determining the appropriate audio output parameters various health factors are considered. The various health actors comprise diagnoses of the infant, gestational age (GA) at birth of the infant, postmenstrual age of the infant at the present time, and/or comorbidities of the infant. The aforementioned various health factors are used to tailor the audio output parameters to meet the specific needs of the patient's physiologic, neurologic, and chronologic needs based on the current clinical guidelines and recommendations (see the age based parameters table, above).

At 1504, the care-giver's voice is recorded reciting appropriate content at a predetermined tempo range. Wherein appropriate sounds and the predetermined tempo range are determined based upon the various health factors (see the age based parameters table, above). In one example embodiment, the care-giver receives pre-recording coaching that is used to make the care giver feel more comfortable and guide the care-giver to producing infant-directed language at a regular interval (e.g., within the tempo range) The pre-recording coaching includes presenting examples of appropriate songs and books (e.g., lullabies, rhyming rhythmic books, or the like), demonstrating how to read the book (e.g., with appropriate pacing, cadence, melody range, etc. as defined by the appropriate content parameters in the age based parameters table, above), and offering to read the books to the care-giver when literacy or experience is an issue. The care-giver may select one or more appropriate songs and/or books to record, in one example embodiment, the care-giver is assisted with keeping the tempo of their speech within the predetermined tempo range (e.g., between about 53 beats per minute to about 65 beats per minute, or as indicated based on the infant's age) by using a metronome and/or visual/tactile reinforcement (e.g., tapping at the desired tempo and/or gesturing, moving, or the like at the desired tempo).

Care-givers are directed through the recording process with stops, starts, and repeats as needed (e.g., such as when the care-giver is speaking at a tempo outside the predetermined tempo range, etc) by the medical professional, a digital instructor, etc. In one example embodiment, each of the selected books and/or songs are read/sung by the care-giver once, with stops for pauses and verbal correction as needed.

A voice recorder with sufficient capabilities to capture and record sound between 50-5,000 hertz and between 5-65 decibels is used to capture the care-giver's voice as rough audio output. The rough audio output is stored digitally, for example, in a Pulse-Code Modulation (PCM) forma, a Waveform Audio Pile (WAV) format, MPEG-1 Audio Layer 3 (MP3) format, or the like.

At 1506, the rough audio output is altered, as needed, to match the age determined audio output parameters to generate an audio output within the audio output parameters. In one example embodiment, the alterations are made using a sound editing application. An example of a sufficient sound editing application is Audacity® distributed under the GNU General Public License. In this embodiment, the first several seconds (e.g., 2-4 seconds) of the rough audio output, which include background noise, are selected to comprise a baseline. A noise reduction function is set to recognize and remove the baseline. Some or all of the rough audio output is selected and a noise reduction function is applied to reduce the noise of the recording (e.g., by 12-20 dB) to reach a preselected decibel range (e.g., between 55-65 dB on scale C) to create a noise reduced reach audio output.

Some or all of the noise reduced rough audio output in selected and an amplification function is set to decrease amplification by a preselected decibel level (e.g., between 5-15 dB). The preselected decibel level Is one of absolute, or based upon the baseline. Additionally, some or all of the noise reduced rough audio output in selected and a second amplification function modifies peak amplification to a second preselected decibel level (e.g., between 5-15 dB). The preselected decibel level and the second preselected decibel level are one of the same or different. The combination of the first and second application function transforms the noise reduced rough audio output to a standardized noise reduced rough audio output.

The standardized noise reduced rough audio output is saved in a digital format and imported into a music editing application, it would b appreciated that the sound editing application and the music editing application can be a same or different application. An example of a sufficient music editing application is GarageBand® sold by Apple Inc. Firstly, noises in frequencies that exceed the care-giver's vocal range are removed via an equalizer function of the music editing software, which is utilized to eliminate frequencies outside an acceptable frequency range (e.g. below 50 Hz and/or above 5,000 Hz). The audio output is generated by cutting the standardized noise reduced rough audio output into individual songs and stories, thus cutting out any stops, pauses, or instruction, looping each song/story a predetermined number of times (e.g. 3-5 times) to last an age appropriate concentration length (e.g. between 2 and 5 minutes), and combining the looped songs and/or stories to comprise a develop mentally appropriate or predetermined duration per audio emission (see the age based parameters table, above). The audio output is exported in a digital format (e.g., MP3) format and/or placed onto a storage device (e.g., a USB drive, a cloud storage system, a computer hard drive, a music player, or other storage capable devices).

At 1508, the audio output is communicated into the music player (e.g., a NICU safe device such as the sanitizable audio device 10, see, for example, FIG. 2) and the music player is placed at the infant's bedside to be utilized by the medical professionals and/or care-givers to emit audio for the developmentally appropriate time (e.g., the duration per audio emission), interval (e.g., number of times per day, and number of days per week the audio output is emitted), and/or volume (for appropriate parameters see the age based parameters table, above, listing developmentally appropriate factors for various ages). The audio output is communicated into the music player via one of wireless communication (e.g., WIFI, short-range wireless interconnection), a hard wire connection (e.g., via the first or second aperture 20, 22, a USB port (e.g. via a USB flash drive), etc. In one example embodiment, the music player is programmed with the parameters of the age based parameters table, such that the can; giver or medical professional may input the infants age, and the music player will play for the indicated appropriate, time, interval, volume, range (e.g. octave range), etc. In another example embodiment, the music player is programmed with the parameters of the age based parameters table by the care-giver or medical professional, who inputs the indicated appropriate, time, interval, volume, range, etc.

Figure 16:
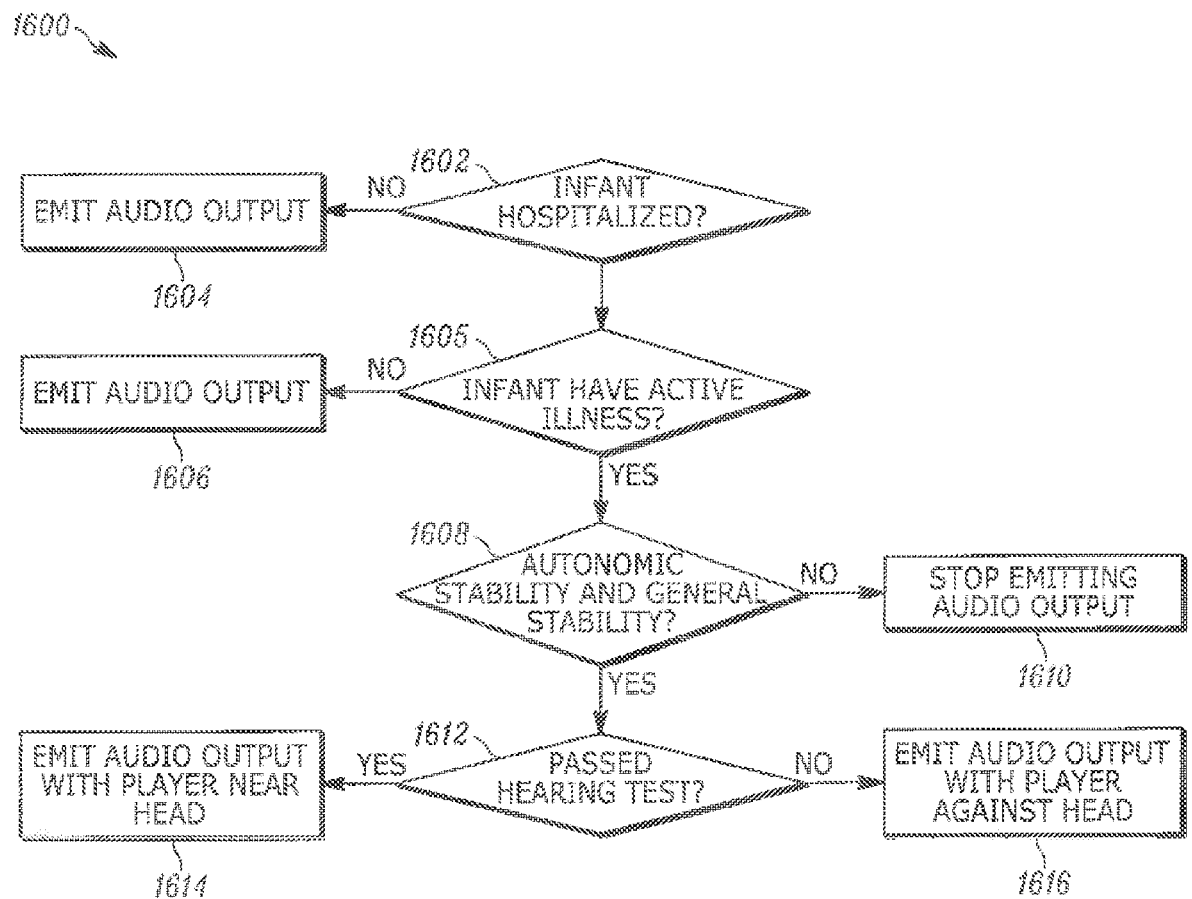
FIG. 16 illustrates a flow diagram for a method of utilizing an audio device in accordance with a third example embodiment of the present disclosure.

Turning to FIG. 16, a method 1600 of utilizing the audio output and music player is disclosed. At 1602, it is determined whether the infant is hospitalized. At 1604, if the infant is not hospitalized, then the audio output will be played for the infant based upon the parameters of the age based parameters table using the method 1500 above to generate the audio output. At 1605, if the infant is hospitalized, then it is determined whether the infant has an active illness. At 1606, if the infant does not have an active illness, then the audio output will be played for the infant based upon the parameters of the age based parameters table using the method 1500 above to generate the audio output. At 1608, if the infant is hospitalized, then it is determined whether the infant has autonomic stability or is stable (e.g., is not in any state of shock). At 1610, if the infant does not have either autonomic stability or is in a state of shock, then audio output will not be emitted by the music player. At 1612, if the infant has autonomic stability or is not in a state of shock, then it will be determined if the infant passed a hearing test. At 1614, if the infant passed the bearing test, then the music player is placed 8-12" from the infant's head. At 1616, if the infant failed the hearing test, then the music player is placed against the infant's head.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any elements) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%. The term "coupled" as used herein is defined as connected or in contact either temporarily or permanently, although not necessarily directly and not necessarily mechanically. A device or structure that is "configured" in a certain way is configured in at least that way, but may also be configured in ways that are not listed.

To the extent that the materials for any of the foregoing embodiments or components thereof are not specified, it is to be appreciated that suitable materials would be known by one of ordinary skill in the art for the intended purposes.

The Abstract of the Disclosure is provided to allow tire reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is nor to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A sanitizable audio device for use in neonatal care, the audio device comprising:
   a smooth shell defining an outer surface and an inner surface, the outer surface forming a curved continuous smooth surface, wherein the outer surface of the smooth shell comprises:
      one or more switch apertures wherein one or more electrical switches, in communication with electronic elements, extend through the aperture and are flush and contiguous with the outer surface of the smooth shell, wherein, the one or more switches are actuatable through contact; and
   the inner surface of the smooth shell housing:
      the electronic elements comprising:
         a speaker configured to emit audio; and
         a transceiver to send and receive audio signals.

2. The audio device of claim 1, the electronic components further comprising:
   an electrical circuit to convert an audio signal received through an aperture into an audio input for the speaker;
   a microcomputer to maintain a volume of the speaker at a preset level; and
   a battery to power at least one of the electronic components.

3. The audio device of claim 1, wherein the shell further comprises a smooth ovate shell formed from a polymeric material.

4. The audio device of claim 3 further comprising a plurality of spaced apart apertures for accessing electronic elements disposed within the smooth ovate shell.

5. The audio device of claim 3 wherein said movement of the audio device comprises vertically tilting the audio device.

6. The audio device of claim 1, wherein responsive to movement of the audio device, the audio device emits audio for a preset time.

7. The audio device of claim 1, wherein the one or more electric switches comprises a power switch, a fast forward switch, and a reverse switch.

8. The audio device of claim 4, wherein the plurality of apertures comprises at least one of a charging port and an input/outport port.

9. The audio device of claim 1, wherein the one or more switches abut and are contiguous with the one or more switch apertures, respectively.

10. The audio device of claim 1, wherein the battery is charged via induction charging.

11. The audio device of claim 4, wherein the battery is charged via a hard line through one of the plurality of spaced apart apertures.

12. The audio device of claim 1, wherein the one or more electric switches project from the inner surface to be flush with the outer surface of the smooth shell.

13. The audio device of claim 1, wherein the one or more switches abut and are contiguous with the outer surface of the smooth shell, and wherein the one or more switches have outer surfaces in a same plane as the out surface of the smooth shell.

14. An audio device for use in neonatal care, the audio device comprising:
   a smooth ovate shell comprising plastic, the smooth ovate shell defining an outer surface and an inner surface, the outer surface forming a curved continuous planar surface, wherein the outer surface of the smooth ovate shell comprises:
      a deformable region that is continuous with the outer surface, the deformable region comprising one or more electrical switches, in communication with the electronic elements, are functionally accessible through at least one of touch and proximity; and
   the inner surface of the smooth ovate shell housing:
      the electronic elements comprising:
         a speaker configured to emit audio;
         an electrical circuit to convert an audio signal received by input to the electrical circuit into an audio input for the speaker;
         a microcomputer in communication with the speaker; and
         a battery to power at least one of the electronic components.

15. The audio device of claim 14 wherein electronic elements comprise an induction charger to charge the battery.

16. The audio device of claim 14 wherein the one or more electrical switches comprise at least one of a proximity sensor and a touch sensor and wherein the audio signal received by input to the electrical circuit is received through a short-range interconnection signal.

17. The audio device of claim 14, the microcomputer configured to maintain a volume of the speaker at a preset level for a preset time and to maintain a volume of the speaker at a preset level based upon an input age of an infant.

18. An audio device for use in neonatal care, the audio device comprising:
   a smooth ovate shell comprising plastic, the smooth ovate shell defining an outer surface and an inner surface, the outer surface forming a curved continuous planar surface, wherein the outer surface of the smooth ovate shell comprises:
      a deformable region, wherein one or more electrical switches, in communication with the electronic elements, are functionally accessible through at least one of touch and proximity, the electrical switches having at least one of surfaces in a same plane with the outer surface of the smooth shell and a plane nearer the electronic elements than the same plane, respectively; and
   the inner surface of the smooth ovate shell housing:
      the electronic elements comprising:
         a speaker configured to emit audio;
         an electrical circuit to convert an audio signal received by input to the electrical circuit into an audio input for the speaker;
         a microcomputer in communication with and providing instructions to the speaker; and
         a battery to power at least one of the electronic components.

19. The audio device of claim 18, the microcomputer configured to at least one of maintain a volume of the speaker at a preset level for a preset time and to maintain a volume of the speaker at a preset level based upon an input age of an infant.

20. The audio device of claim 18, wherein the one or more electric switches project from the inner surface to be functionally accessible from the outer surface of the smooth shell.

* * * * *